United States Patent
Koran et al.

(10) Patent No.: US 12,555,134 B2
(45) Date of Patent: Feb. 17, 2026

(54) SYSTEM OF DETERMINING ADVERTISING INCREMENTAL LIFT

(71) Applicant: Zeta Global Corp., New York, NY (US)

(72) Inventors: Joshua Koran, San Francisco, CA (US); Anthony Gesek, San Francisco, CA (US); Bashir Eghbali, San Francisco, CA (US); Stephen George, New York, NY (US)

(73) Assignee: Zeta Global Corp., New York, NY (US)

( * ) Notice: Subject to any disclaimer, the term of this patent is extended or adjusted under 35 U.S.C. 154(b) by 0 days.

(21) Appl. No.: 17/463,474

(22) Filed: Aug. 31, 2021

(65) Prior Publication Data
US 2022/0067778 A1    Mar. 3, 2022

Related U.S. Application Data

(60) Provisional application No. 63/139,772, filed on Jan. 20, 2021, provisional application No. 63/072,912, filed on Aug. 31, 2020.

(51) Int. Cl.
*G06Q 30/0242* (2023.01)
*G06Q 30/0251* (2023.01)

(52) U.S. Cl.
CPC ..... *G06Q 30/0243* (2013.01); *G06Q 30/0259* (2013.01)

(58) Field of Classification Search
CPC .............. G06Q 30/0243; G06Q 30/0259
See application file for complete search history.

(56) References Cited

U.S. PATENT DOCUMENTS 5,848,396 A * 12/1998 Gerace ............... G06Q 30/0201
  705/7.33
7,228,287 B1 * 6/2007 Samson ............. G06Q 30/0211
  705/14.39

(Continued)

OTHER PUBLICATIONS

Zhenyu Zhao; Maximum Relevance and Minimum Redundancy Feature Selection Methods for a Marketing Machine Learning Platform; Jan. 23, 2020; IEEE.*

*Primary Examiner* — Arthur Duran
(74) *Attorney, Agent, or Firm* — Schwegman Lundberg & Woessner, P.A.

(57) ABSTRACT

A method of determining effectiveness of an advertising campaign comprising: bidding on available advertising inventory; obtaining online impression data from at least one advertisement for at least one successful bid; matching, via a data cloud, the online impression data to a plurality of unique consumers; matching, via the data cloud, a plurality of unique consumers to at least one unsuccessful bid; determining characteristics of consumers for impression data who performed a desired event; determining characteristics of consumers for impression data who did not perform the desired event; determining characteristics of consumers from the at least one unsuccessful bid who performed the desired event; determining characteristics of consumers from the at least one unsuccessful bid who did not perform the desired event; determining consumer characteristics likely to lead to the desired event; and measuring the impact of the at least one successful bid.

18 Claims, 7 Drawing Sheets

(56) References Cited

U.S. PATENT DOCUMENTS

| | | | | |
|---|---|---|---|---|
| 7,643,658 B2* | 1/2010 | Kilner | ................ | G06Q 30/0201 |
| | | | | 382/118 |
| 9,299,078 B2* | 3/2016 | Gierkink | ............... | G06Q 20/382 |
| 2003/0032890 A1* | 2/2003 | Hazlett | .................. | A61B 5/389 |
| | | | | 600/546 |
| 2003/0115131 A1* | 6/2003 | Heaton | .................. | G06Q 40/00 |
| | | | | 705/37 |
| 2006/0041480 A1* | 2/2006 | Briggs | ............... | G06Q 30/0249 |
| | | | | 705/14.41 |
| 2008/0065476 A1* | 3/2008 | Klein | ................ | G06Q 30/0239 |
| | | | | 705/14.66 |
| 2009/0030780 A1* | 1/2009 | York | ...................... | G06Q 30/02 |
| | | | | 705/7.29 |
| 2009/0247193 A1* | 10/2009 | Kalavade | ................ | H04L 67/18 |
| | | | | 455/456.3 |
| 2014/0279138 A1* | 9/2014 | Seid | .................. | G06Q 30/0278 |
| | | | | 705/306 |
| 2015/0294372 A1* | 10/2015 | Sweeney | ............ | G06Q 30/0275 |
| | | | | 705/14.71 |
| 2016/0042446 A1* | 2/2016 | Chandrasekaran | .... | G06Q 30/08 |
| | | | | 705/26.3 |
| 2016/0170996 A1* | 6/2016 | Frank | ................ | G06Q 30/0203 |
| | | | | 707/748 |
| 2016/0170998 A1* | 6/2016 | Frank | ................ | G06F 16/9535 |
| | | | | 707/748 |
| 2017/0098236 A1* | 4/2017 | Lee | ...................... | G06Q 10/067 |
| 2017/0099525 A1* | 4/2017 | Ray | ..................... | H04N 21/2668 |
| 2018/0096397 A1* | 4/2018 | Goeldi | .............. | G06Q 30/0271 |
| 2018/0374147 A1* | 12/2018 | Wang | ................... | G06Q 30/08 |
| 2020/0226675 A1* | 7/2020 | Mitra | .................... | G06N 3/084 |
| 2020/0234331 A1* | 7/2020 | Sadowsky | ........... | G06Q 30/0254 |
| 2021/0035163 A1* | 2/2021 | Peris | .................. | G06Q 30/0243 |
| 2021/0312395 A1* | 10/2021 | Harsham | ................ | H04W 4/90 |

* cited by examiner

SYSTEM OF DETERMINING ADVERTISING INCREMENTAL LIFT

PRIORITY

This application claims the benefit for U.S. Provisional Patent Application No. 63/072,912, inventors Joshua Koran and Anthony Gesek entitled "System of determining Advertising Incremental Lift," and U.S. Provisional Patent Application No. 63/139,772, inventors Joshua Koran, Anthony Gesek, and Bashir Eghbali entitled "System of determining advertising incremental lift" both of which are incorporated by reference in its entirety and made a part thereof.

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

BACKGROUND

The present invention is directed at placing advertisements in web pages accessed via the Internet and specifically a server to help marketers measure which end consumers are incrementally responding after being exposed by a marketing message, how to allocate marketing spend, and how to optimize bandwidth.

The Internet and World Wide Web have made a vast body of knowledge available to anyone with a computer network connection.

Within this patent, the term "publisher" means a company, government entity, or other organization that provides a web site accessible via the Internet. Publishers may provide all of the content of their web sites or may embed content provided by other sources. For example, many websites are supported, at least in part, by advertisements presented within web pages. Publishers of ad-supported web sites may sell space on their web pages for advertisements.

In this patent, an "ad broker" is a company that places ads in publisher web pages. The ad broker such as space between publishers and advertisers. The ad broker may act as a media buyer that purchases ad space from publishers and sells the space from publishers and sells the space to various advertisers or advertising agencies.

A publisher may be paid and an advertiser may be charged for each "impression" or each time the advertiser's ad appears on the publisher's website. The publisher may be paid and the advertiser may be charged an additional "click through" amount for each viewer who interacts with the ad, for example, by clicking on the ad or an element within the ad.

Traditionally, marketers evaluate effectiveness of a campaign by looking at a response rate of particular ads. More advanced versions of this model involved looking at positive events such as click-throughs or purchases and looking back at what advertisements the consumer viewed. These models suffer from frequency purchase problem. The viewed advertisements take credit for normal behavior that a consumer would have done regardless of whether the consumer viewed the advertisement.

Marketers attempted to overcome this problem and more accurately measure advertising effectiveness by creating a hold-out group who are specifically not shown the advertisement. The marketer then measures the response rate of those who were shown the advertisement against the response rate of those who were shown a control or a placeholder advertisement. This system is costly—both monetarily and because it causes unnecessary advertisement/bandwidth to be sent to the hold out group. This existing solution also requires start-up costs, is delayed, and comes with lost opportunities. Further, the marketer may create a holdout/control group that are impossible to reach and create statistical analysis problems due to the sample size and hidden bias based on relative percentage of which group can be reached.

The present invention overcomes these problems by retroactively creating synthetic group in the bid stream. Thus, the lift measuring machine compares the behaviors of the consumers who were not exposed to the ad, but who were in the bidstream, with the behaviors of those who were exposed to the ad as is further detailed in this disclosure.

DESCRIPTION OF THE DRAWINGS

Some embodiments of the present disclosure are illustrated by way of example and not limitation in the figures of the accompanying drawings, in which like reference numbers indicate similar elements.

DETAILED DESCRIPTION OF THE INVENTION

The description that follows includes illustrative systems, methods, techniques, instruction sequences, and computing machine program products that embody illustrative embodiments. In the following description, for purpose of explanation, numerous specific details are set forth in order to provide an understanding of various embodiments of the inventive subject matter. It will be evident, however, to those skilled in the art that embodiments of the inventive subject matter can be practiced without these specific details. In general, well-known instruction instances, protocols, structures, and techniques have not been shown in detail. It should also be understood by those with skill in the art may combine elements from various embodiments in practicing the present invention.

Systems and methods in accordance with the disclosure herein use bidstream data and matching consumer demographics and behavioral history to determine the effectiveness of a particular advertising placement, bid, and the like. In this manner, the methods and systems can determine if characteristics of consumers in a particular target group are better to target, or if they would have done a desired event without the ad impression.

In this matter, the system is comprised of a method of determining effectiveness of an advertising campaign comprising: bidding on available advertising inventory; obtaining online impression data from at least one advertisement for at least one successful bid; matching, via a data cloud, the online impression data to a plurality of unique consumers; matching, via the data cloud, a plurality of unique consumers to at least one unsuccessful bid; determining characteristics of consumers for impression data who performed a desired event; determining characteristics of consumers for impression data who did not perform the desired event; determining characteristics of consumers from the at least one unsuccessful bid who performed the desired event; determining characteristics of consumers from the at least one unsuccessful bid who did not perform the desired event; determining consumer characteristics likely to lead to the desired event; and measuring the impact of the at least one successful bi.

Figure 1:
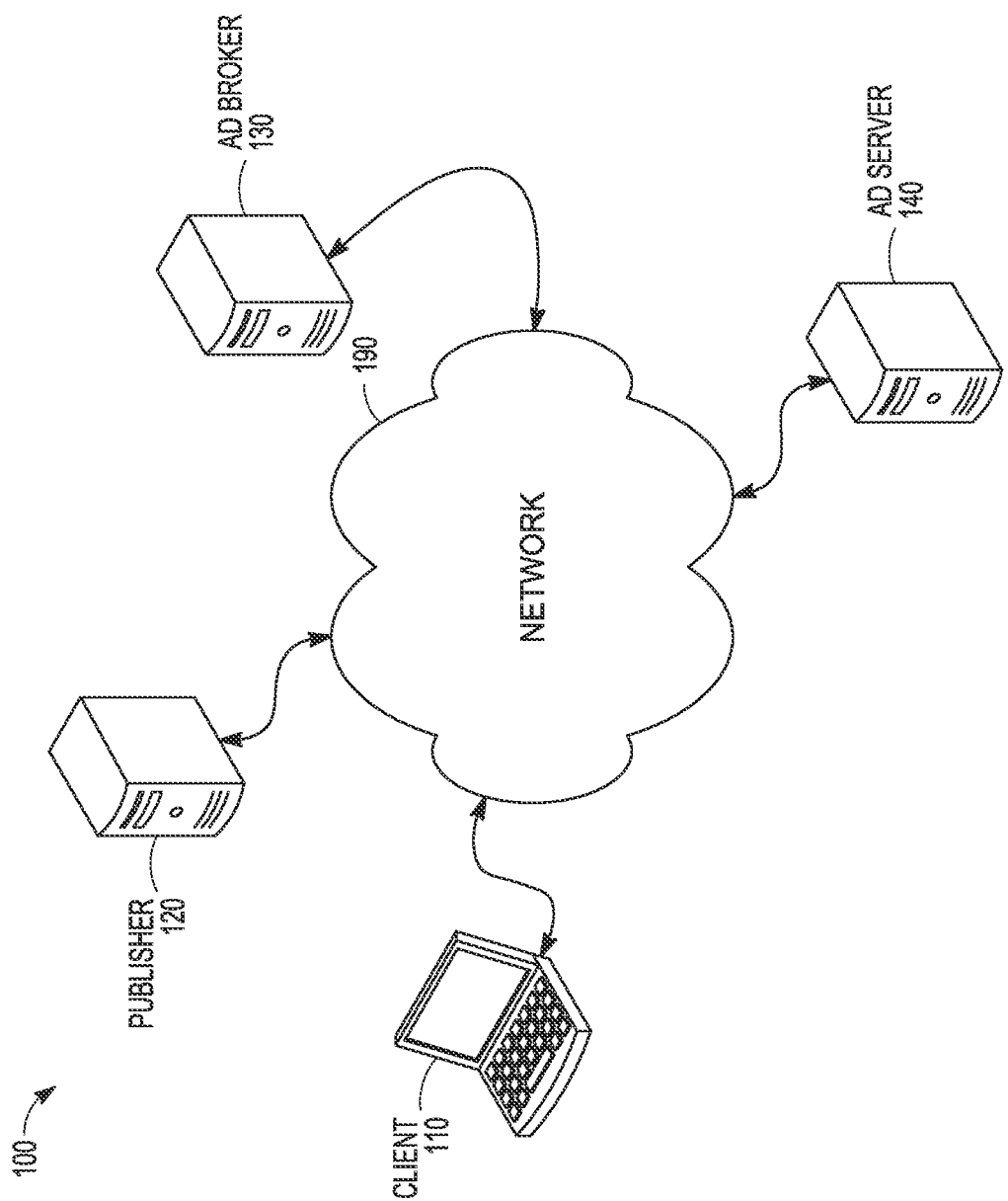
FIG. 1 is a block diagram of a networked system.

Referring to FIG. 1, a network environment 100 may include a client computer 110, a publisher server 120, an ad broker server 130, and an ad server 140 coupled via a network 190. The network 190 may be or include the Internet. Although FIG. 1 shows for ease of explanation a single client computer and three servers, it must be understood that millions of clients and many thousands of servers may be connected to the Internet simultaneously.

The client computer 110 may be used by a "requestor" to access the Internet including the World Wide Web. Although shown as a portable computer, the client computer 110 may be any computing device including but not limited to a desktop personal computer, a portable computer, a laptop computer, a computing tablet, a set top box, a video game system, a personal video recorder, a telephone, a connected television device, or a personal digital assistant.

The publisher server 120 may store and "serve" or provide web pages in response to requests received via the network 190 from other devices such as the client computer 110. When a web page to be served includes one or more regions allocated for ad units, the publisher server may request the ad broker server to provide data defining the ad units to be incorporated into the web page.

The ad broker server 130 may store contracts or rules defining relationships between the ad broker and a plurality of advertisers. When the publisher server 120 requests data identifying an ad to be placed in a web page, the publisher server may select an advertisement and provide the requested identifying data.

The ad server 140 may store one or more ad unit objects defining one or more ads. After an ad has been selected by the ad broker server 130, the ad server may provide the ad unit object for the select ad in response to a request from the publisher server 120 or the client computer 110.

The ad broker server 130 and the ad server 140 may be physically or geographically separate or the ad broker server 130 and the ad server 140 may be combined in a single server 130 and the ad server 140 may be combined in a single server or a cluster of servers. The ad broker server 130 and the ad server 140 may be controlled by separate business entities or by a single business. Some or all of the publisher server 120 ad broker server 130 and the ad server 140 may be virtual servers within a cloud.

Figure 2:
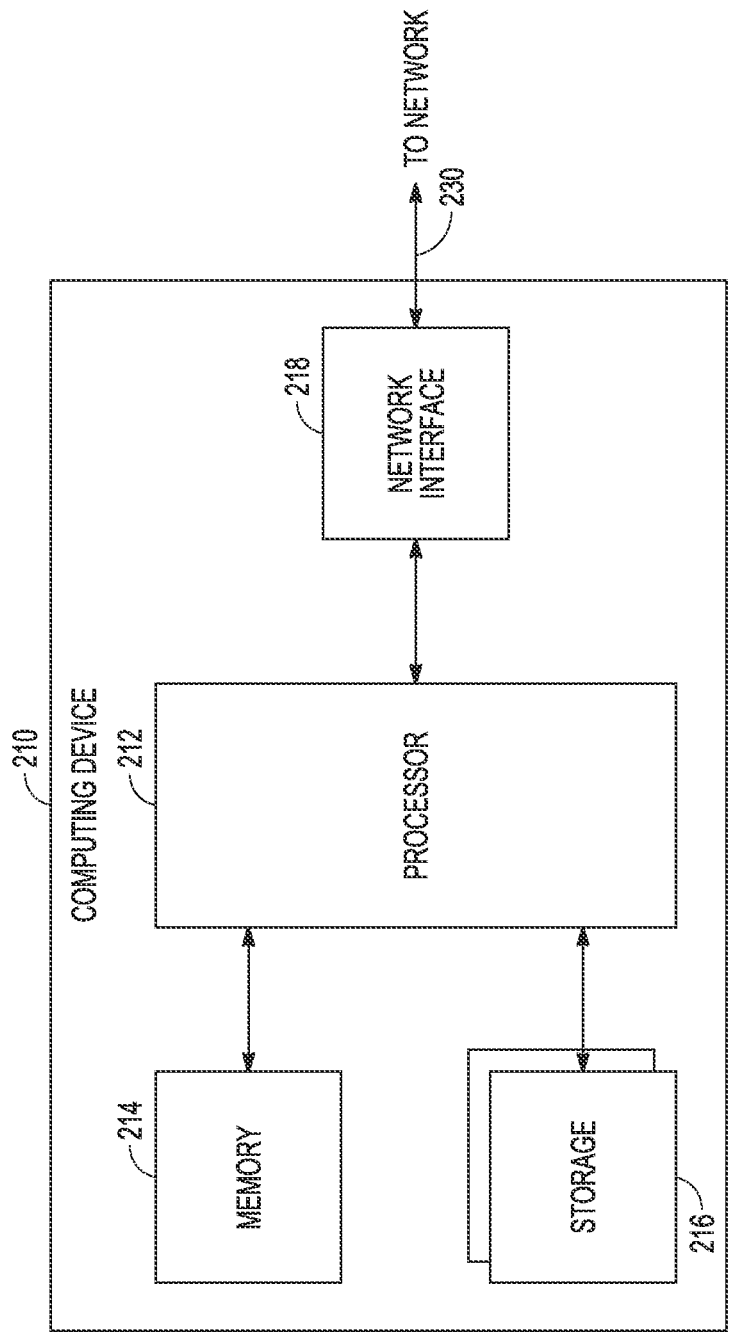
FIG. 2 is a block diagram of a computing system.

Each of the client computer 110, the publisher server 120, the ad broker server 130 and the ad server 140 may be a computing device 210, as shown in FIG. 2. The computing device 210 may include at least one processor 212 memory 214 and a network interface 218. Servers in particular may contain a plurality of processors. The computing device 210 may include or be coupled to one or more storage devices 216. A client computer may also include or be coupled to a display device and user input devices, such as a keyboard and mouse not shown in FIG. 2.

Each of the client computer 110 the publisher server 120 the ad broker server 130 and the ad server 140 may execute software instructions to perform the actions and methods described herein. The software instructions may be stored on a machine readable storage media storage device such as the storage device 216. These storage media include, for example, magnetic media such as hard disks, floppy disks, and tape; optical media such as compact disks (CD-ROM and CD_RW) and digital versatile disks (DVD and DVD-RW); flash memory cards; and other storage media. The term "storage media" is not intended to encompass a transient medium such as a signal or waveform, conveying software instructions or other data.

The client computer may run an operating system including for example, variations of the Linux, Microsoft Windows, Symbian, and Apple Mac operating systems. To access the Internet, the client computer may run a browser such as Microsoft Explorer, Google Chrome, Mozilla Firefox, and/or an email program such as Microsoft Outlook or Lotus Notes. It should be appreciated that some email programs are cloud-based. Each of the publisher server 120 the ad broker server 130 and the ad server 140 may run an operating system and one or more application programs to perform the actions and methods described herein.

Each of the client computer 110 and the servers 120 130 140 may include various specialized units, circuits, firmware, software and interfaces for providing the functionality and features described here. The process, functionality and features may be embodied in whole or in part in software executed by a processor. The hardware, firmware, and software and their functions may be distributed such that some function and features are performed by a processor and others by devices.

A data aggregator maintains one or more databases comprising individual-record-level database that includes (1) anonymous unique identifiers, (2) viewing/browsing behavior, (3) consumer data. The consumer data includes characteristics that may include, but are not limited to, general geographic location, household characteristics such as household composition, age, gender, race, range of income, occupation, dwelling type, etc., as well as characteristics such as past purchasing behavior and other purchase and lifestyle characteristics such as media preferences or hobbies. Other characteristics may include browsing, clicking, reading, previously shown advertisements, click-through response on viewing an ad, purchasing data, etc.

Figure 4:
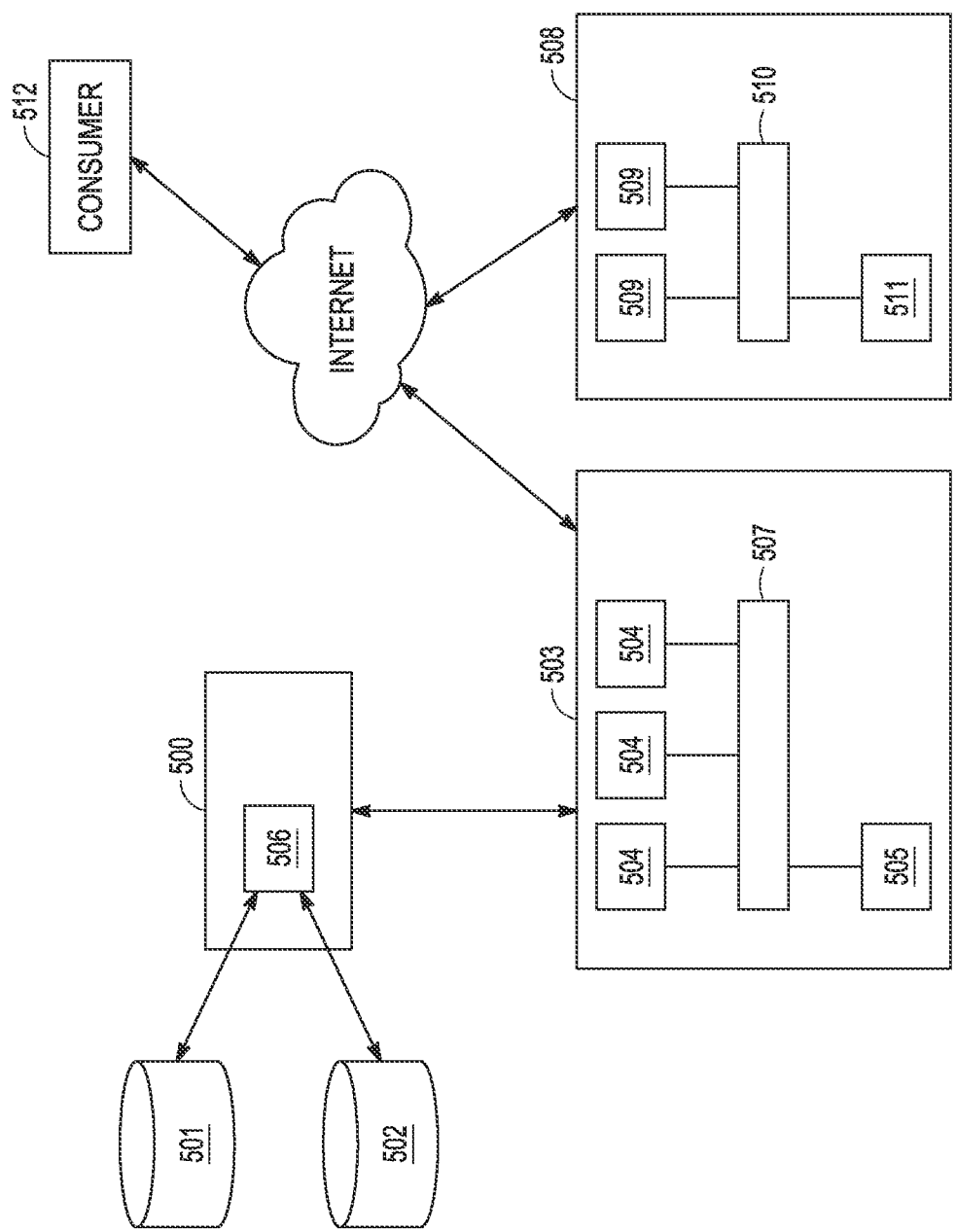
FIG. 4 is a block diagram of components of the present invention.

With reference to FIG. 4, the Online Data Aggregator, or data cloud, creates an expanded online database with consumer and household characteristics appended to the online data records. This is typically done through a Cookie Match Partner 401. The Cookie Match Partner 401 leverages publisher partners 402 to match PII (such as an email address) to Consumer Characteristics. During a web session, the publisher 402 passes PII to the Cookie Matcher Partner 401, in step 1, who then links the PII to consumer characteristics in step 2; creates a unique anonymous identifier linked to the characteristics in step 3; and destroys the PH. What remains is a database 403 that links a browser cookie to a universal identifier (UID), step 4, to consumer characteristics (such as "W18-24"). Then, when the Online Data Aggregator accesses a cookie when serving an ad into a publisher site in step 5, the Online Data Aggregator may query the Cookie Match Partner 401 to link the cookie to a UID in step 6. If the UID is unknown, the Cookie Match Partner may pass the UID to the Online Data Aggregator in step 7. If the UID is known, the Online Data Aggregator may lookup the UID in its own targeting database in step 8. The consumer characteristics linked to the UID are then accessed in step 9, and may be used to serve ads in step 10 by Online Audience Targeting Company 404. The expanded online data records are stored in a computer database, Extended Online Database 404, in step 11, and are made available for further analysis.

Exemplary hardware and software employed by the systems are now generally described with reference to FIG. 5. Database server(s) 500 may include a database services management application 506 that manages storage and retrieval of data from the database(s) 501, 502. The databases may be relational databases; however, other data organizational structure may be used without departing from the scope of the present invention. One or more application server(s) 503 are in communication with the database server 500. The application server 503 communicates requests for data to the database server 500. The database server 500 retrieves the requested data. The application server 503 may also send data to the database server for storage in the database(s) 501, 502. The application server 503 comprises one or more processors 504, computer readable storage media 505 that store programs (computer readable instructions) for execution by the processor(s), and an interface 507 between the processor(s) 504 and computer readable storage media 505. The application server may store the computer software programs referred to herein.

To the extent data and information is communicated over the web, one or more web servers 508 may be employed. The web server 508 also comprises one or more processors 509, computer readable storage media 511 that store programs (computer readable instructions) for execution by the processor(s) 509, and an interface 510 between the processor(s) 509 and computer readable storage media 511. The web server 508 is employed to deliver content that can be accessed through the communications network, e.g., by consumer 512. When data is requested through an application, such as a web browser, the web server 508 receives and processes the request. The web server 508 sends the data or application requested along with user interface instructions for displaying a user interface.

The computers referenced herein are specially programmed to perform the functionality described herein as performed by the software programs.

The computer readable storage media may include volatile and non-volatile, removable and non-removable media implemented in any method or technology for storage of information such as computer-readable instructions, data structures, program modules, or other data. Computer readable storage media may include, but is not limited to, RAM, ROM, Erasable Programmable ROM (EPROM), Electrically Erasable Programmable ROM (EEPROM), flash memory or other solid state memory technology, CD-ROM, digital versatile disks (DVD), or other optical storage, magnetic cassettes, magnetic tape, magnetic disk storage or other magnetic storage devices, or any other medium which can be used to store the desired information and which can be accessed by the computer system.

When bidding on the advertisement placements occurs, the publisher includes data sufficient to match the placement to a particular user of an internet enabled device. This information, including availability of the ad placement itself, is stored in the data cloud. After advertisements are shown, the consumer response to the advertisement is also stored in the data cloud and associated with the unique consumer id along with all the other consumer browsing and purchase information that has been captured by the system.

The data cloud can include profiles of different users of internet enabled devices. Each user profile can contain every segment/product interest and event observed by a user that has been captured by the system via the servers. As referenced herein, the system can include information from third-party data stores matched (either combining or matching in real-time while maintaining separated data stores) to the unique consumer IDs. In some aspects, the information matching is done, as described herein, using a user cookie level (i.e. user profile limited to a particular device). In some aspects, the user data cloud is limited to a particular storage system such as a mass storage device. In some aspects, the user profiles are imported and exported to updated profiles stored on vendor servers.

A user (via the Internet enabled device) initiates the web browser application to visit a webpage. The application will then come across a tagged website associated with a vendor server. When the tagged site is visited, the site through the vendor server will deliver content of the page to the user together with the execution of the tag. The tagged website can include code that when executed can send details of the page view, detailed about the visitor session, and cookies to the server. The user information is then used to determine whether to bid, how much to bid, and what type of content to target the consumer with.

Figure 5:
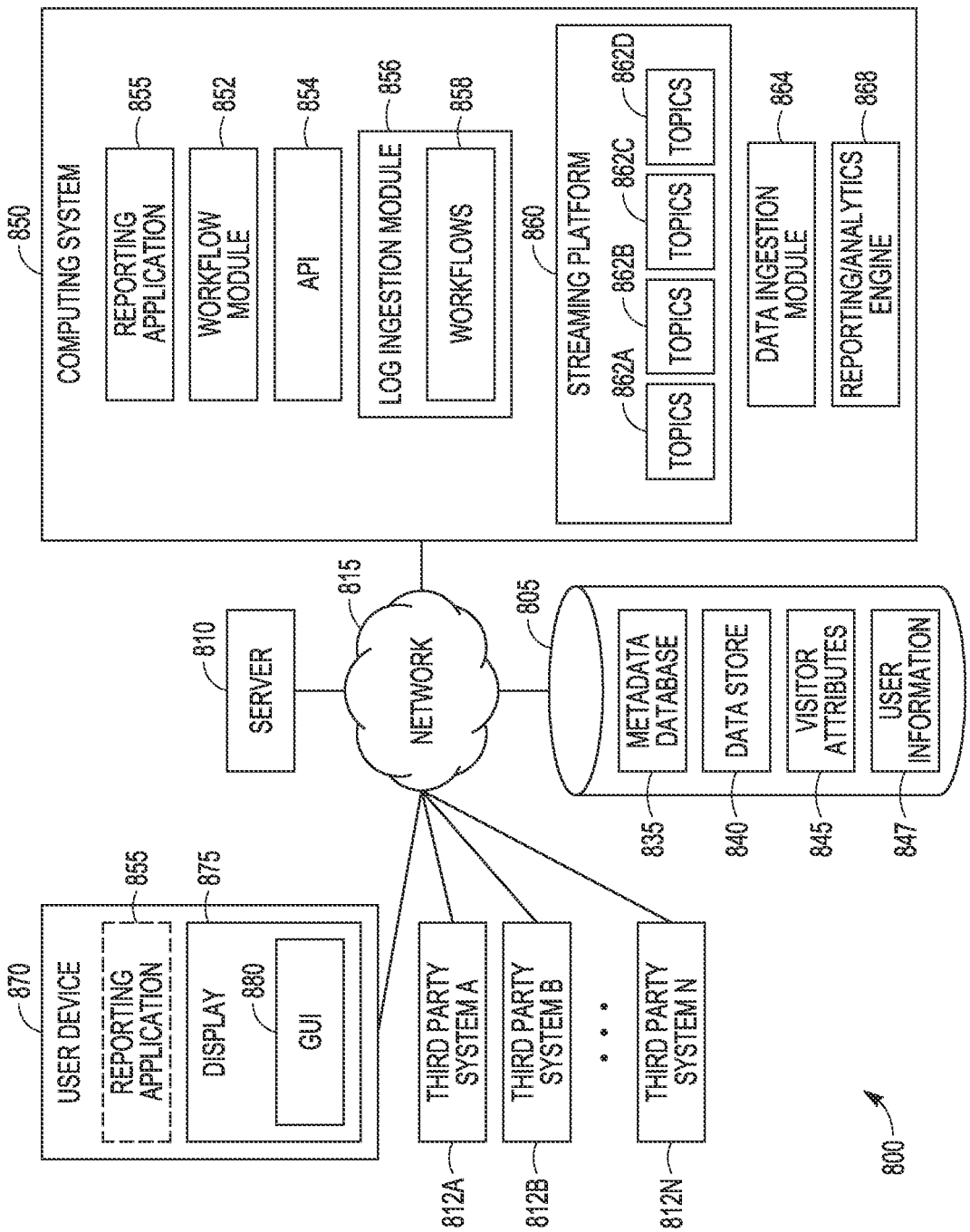
FIG. 5 is a block diagram of components of the present invention.

FIG. 5 is network diagram of a system 800 for providing real-time values determined based on aggregated data from disparate systems in accordance with and exemplary embodiment. The system 800 for providing real-time values determined based on aggregated data from disparate systems can include one or more data sources 805, one or more servers 810, one or more third party systems A-N 812*a-n*, one or more computing systems 850, and one or more user devices 870. The computing system 850 can be in communication with the data sources 805, server(s) 810, the third party systems A-N 812*a-n*, and the user devices 870, via a communications network 815.

The computing system 850 can execute a reporting application 855, workflow module 852, log ingestion module 856, data ingestion module 864, and a reporting/analytics engine 868 to implement the system 800 for providing real-time values determined based on aggregated data from disparate systems. The computing system 850 can also include a streaming platform 860 and an Application Program Interface (API) service 854 to communicate with the streaming platform 860. The one or more user devices 870 can execute an instance of the reporting application 855, hosted by the computing system 850, and/or can interface with the computing system, which can execute an instance of the application on behalf of the one or more user devices 870. The one or more user devices 870 can include a display 875 for rendering a graphical user interface (GUI) 880.

In an example embodiment, one or more portions of the communications network 815, can be an ad hoc network, a mesh network, an intranet, an extranet, a virtual private network (VPN), a local area network (LAN), a wireless LAN (WLAN), a wide area network (WAN), a wireless wide area network (WWAN), a metropolitan area network (MAN), a portion of the Internet, a portion of the Public Switched Telephone Network (PSTN), a cellular telephone network, a wireless network, a WiFi network, a WiMax network, any other type of network, or a combination of two or more such networks.

The server 810 includes one or more computers or processors configured to communicate with the computing system 850, third party systems A-N 812a-n, and user devices 870, via the communications network 815. The data sources 805 may store information/data, as described herein. For example, the data sources 805 can include multiple databases, including a metadata database 835, a data store database 840, a visitor attributes database 845, and a user information database 847. The metadata database 835 can store metadata associated with campaigns. The data store database 840 can data associated with campaigns ingested from the third party systems A-N 812a-n. The visitor attribute database 845 can store data associated with data derived/calculated/determined during an enrichment process. The user information database 847 can store information associated with users such as information associated a user's contracts with the third party systems A-N 812a-n for services provided to the user. The data sources 805 can be located at one or more geographically distributed locations from the computing system 850. Alternatively, the data sources 805 can be located at the same geographically as the computing system 850.

In one embodiment, the computing system 850 can receive a request to initiate a campaign and a selection of third party systems A-N 812a-n, from the user device 870. The computing system 850 can execute the workflow module 852 in response to receiving request to initiate a campaign and a selection of third party systems A-N 812a-n. The workflow module 852 can call the API service 854 to initiate a campaign setup, specifying the selection of third party systems A-N 812a-n to be included in the campaign as well as the metadata associated with the campaign.

The API service 852 can store the metadata associated with the campaign in the metadata database 835. As a non-limiting example, the metadata can include one or more of campaign ID, line ID, ad ID, and creative ID. The API service 852 can create workflows 858 in the log ingestion module 856 for each of the selected third party systems A-N 812a-n. Each of the workflows 858 can download files from each of the selected third party systems. The files can include can be impression/event-level logs associated with the campaign. Impressions can be embodied as a view or ad view referring to a point at which an ad is viewed by a user and/or displayed on a web page. The number of impressions of a particular campaign can be determined by the number of times a particular webpage with the advertisement is located and/or loaded. As an example, the files can be posted by the third party systems A-N 812a-n to a Secure File Transfer Protocol (SFTP), File Transfer Protocol (FTP), Google Cloud Storage, and/or Amazon Web Services (AWS) S3 bucket.

Figure 3:
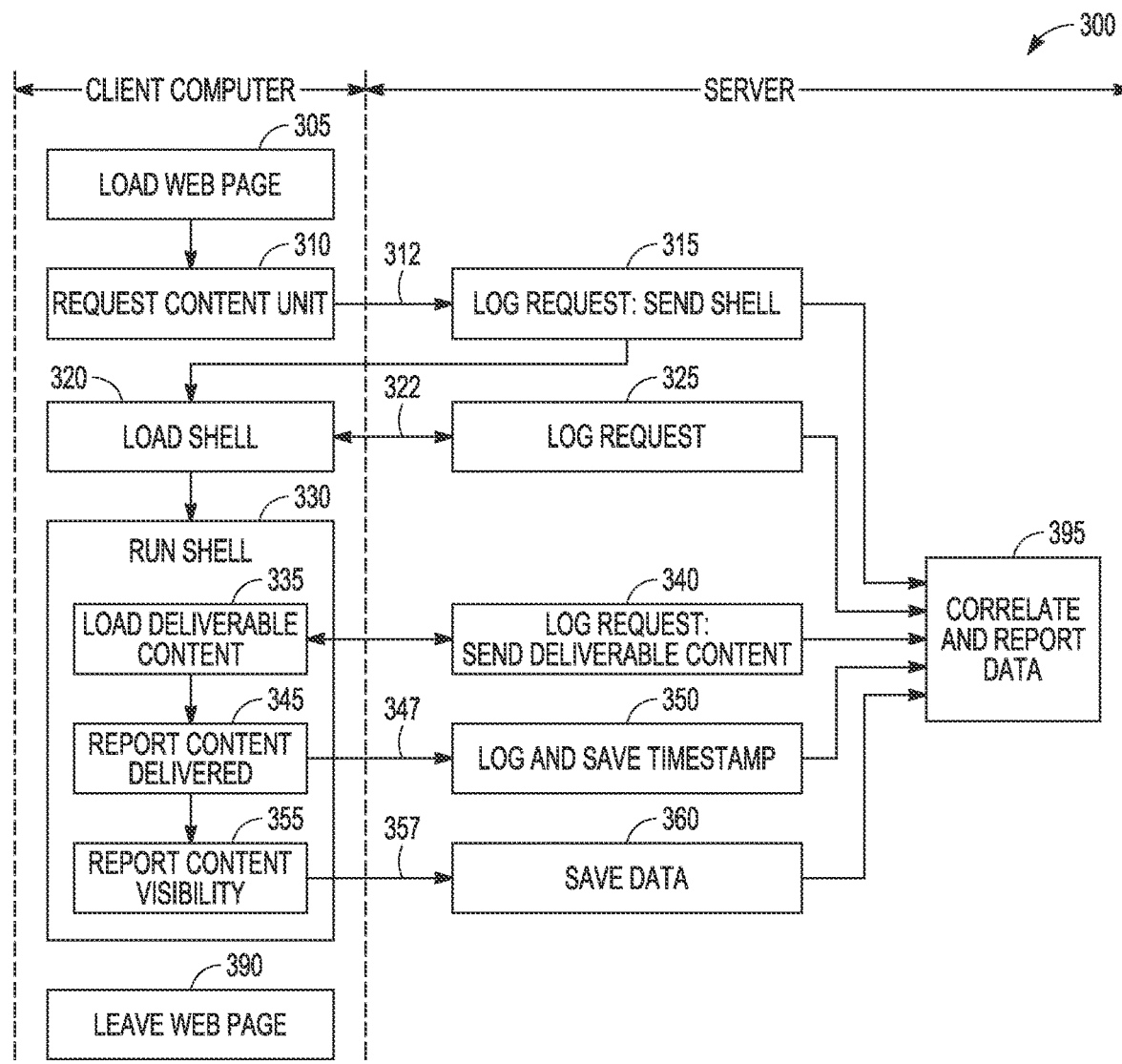
FIG. 3 is a block diagram of components of the present invention.

Each workflow 858 streams the downloaded files to a specific topic 862 in a streaming platform 860. In one embodiment, the topics 862 can be associated with a type of third party system A-N 812a-n. The workflows 858 can stream the files to the respective topics 862 based on the type of third party system A-N 812a-n the files were downloaded from. The data ingestion module 864 can execute an enrichment and/or an extract, transform, load (ETL) process on the files streamed in the different topics 862. During the ETL process, the data ingestion module 864 can break down the datasets from the files. Each of the datasets can be associated with a unique transaction ID. The data ingestion module 864 can validate the unique transaction ID, aggregate, join, and/or merge datasets from different third party systems A-N 812a-n, based on the unique transaction ID. The enrichment and ETL process will be described in further detail with respect to FIG. 3. The data ingestion module 864 can read the datasets in the log lines of the files from each respective topic, map the datasets from the log lines into fields of a common (normalized) format, transform the datasets, and load the datasets for storage in the data store database 840.

A unique transaction ID can be assigned to each dataset in each of third party system using tags disseminated by the computing system 850. The tags can be code (e.g., HTML) embedded in and assigned to datasets such as impressions, links, and/or other event level data associated with a particular campaign. The tags can identify types of datasets. For example, the tag can be a display tag, a video tag, creative tag, and/or a specialized tag. The unique transaction ID can be generated at execution of an impression.

The reporting/analytics engine 868 can retrieve/read the datasets stored in the data store database 840. Additionally, the reporting/analytics engine 868 can retrieve information associated with the user of the user device, from the user information database 847. For example, the information associated with the user of the user device can be contract data associated with contract for services between the user and the third party systems A-N 812a-n. The reporting/analytics engine 868 can calculate values associated with the campaign using the aggregated datasets from the groups and the contract data. The reporting analytics engine 868 can generate a report including the calculated values.

The reporting application 855 can generate a GUI 880 rendering the generated report. The instance of the reporting application 855 executing on the user device 870 can render the GUI 880 on the display 875 of the user device.

Figure 6:
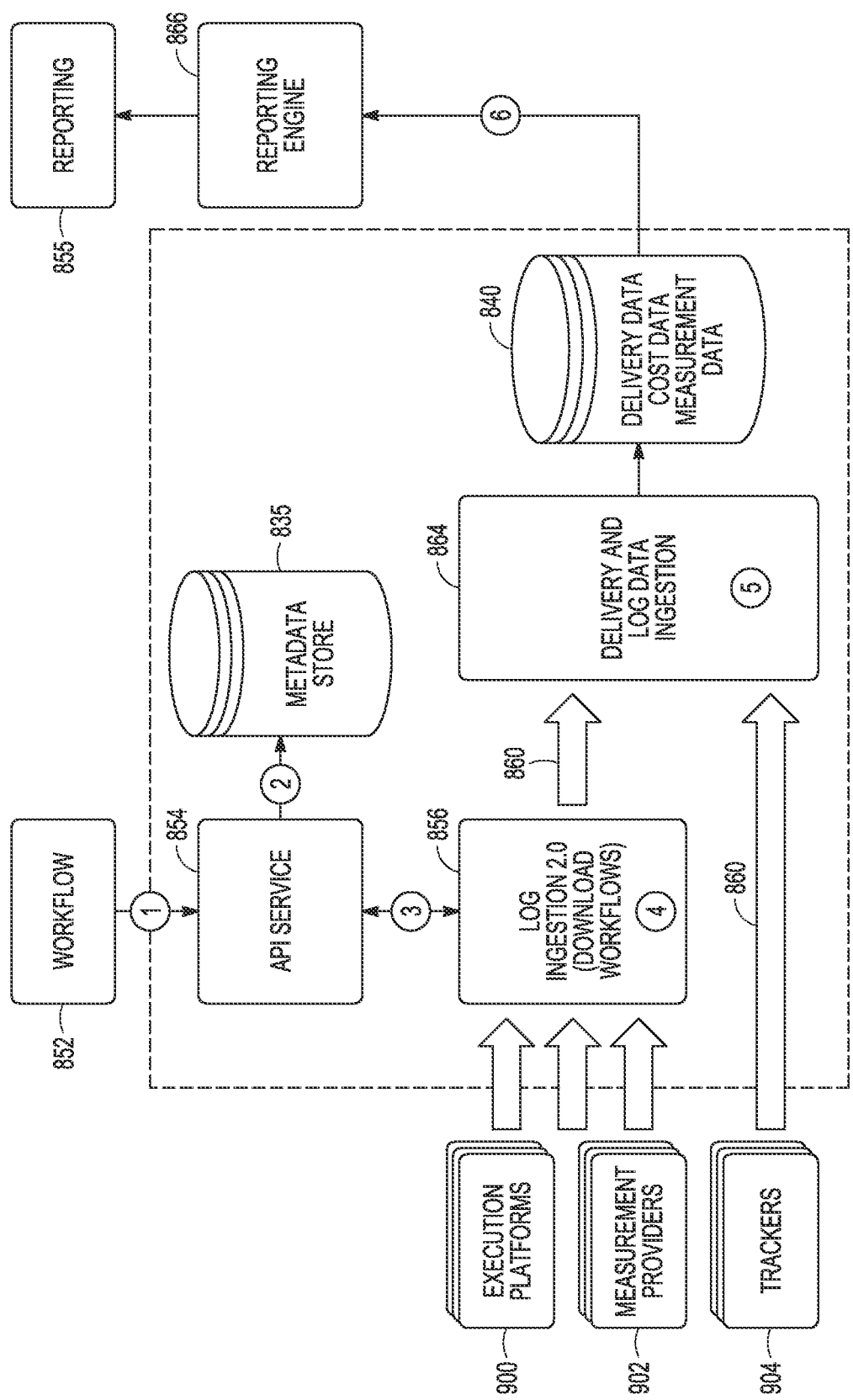
FIG. 6 is a block diagram of components of the present invention.
Figure 7:
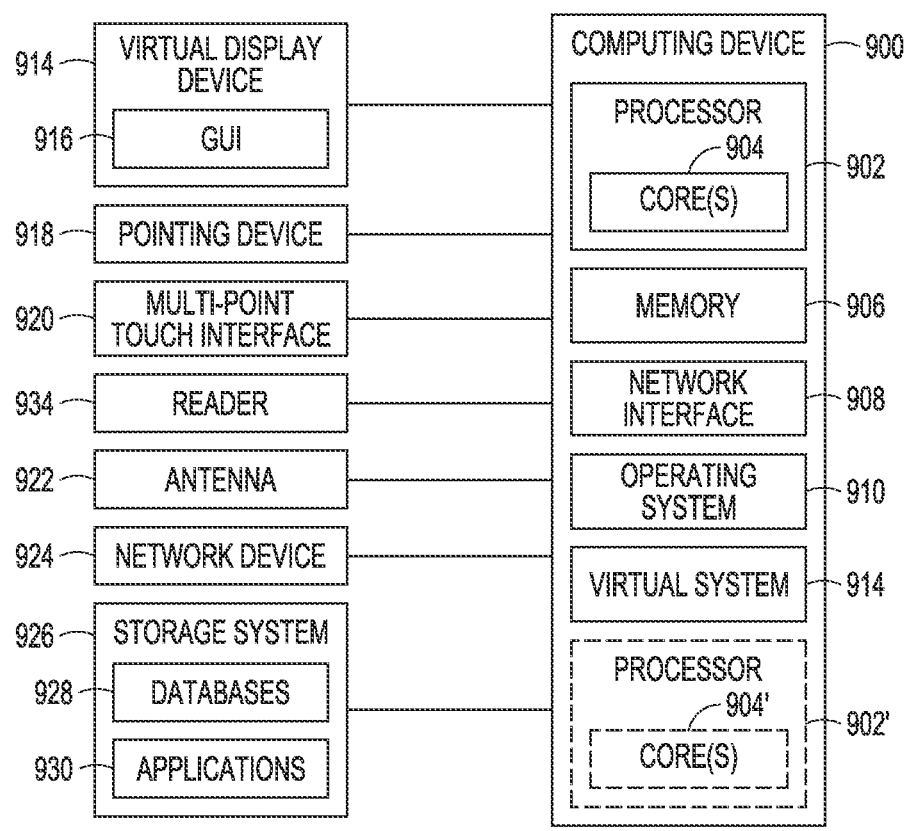
FIG. 7 is a block diagram of components of the present invention.

FIG. 6 illustrates an architecture 900 for implementing the system for providing real-time values determined based on aggregated data from disparate systems in accordance with and exemplary embodiment. A workflow module 852 can API service 854 to initiate a campaign setup, specifying the specific vendors to be included in the campaign and on which vendor to execute the campaign buying, as well as credentials for each vendor. The vendor can be a third party system (e.g., third party system A-N 812a-n). As an example, the vendors can be execution platforms 900, measurement providers 902, and trackers 904. The workflow module 852 can be embodied as a Visto™ Workflow. The workflow module 852 can also provide the API service 854 metadata associated with the campaign. The API Service 854 can store metadata provided by workflow module 852 in a metadata database 835. The metadata database 835 can be embodied as a Postgres database.

The API Service 854 can create workflows in the log ingestion module 856. The log ingestion module 856 can be embodied as Conflux. The workflows can download files such as impression/event-level logs for each of the vendors used by the client. As an example, the execution platforms 900 and measurement providers 902 can post log files to an SFTP location, an FTP location, Google Cloud Storage, and/or AWS S3 bucket. The workflows can stream the files into topics in a streaming platform 860 such as Apache Kafka. Apache Kafka is a streaming platform which allows systems and users to subscribe and publish data to any number of systems and real-time applications. The data can be received by Apache Kafka and partitioned by topics. The topics can be specified. For example, the topics can be specified based on the type of dataset (i.e., trackers, cost data, measurement data, and/or ad server data). Trackers 904 can stream respective files directly to the streaming platform 860.

The data ingestion module 864 can receive the streamed files from the different topics from the streaming platform 860. The data ingestion module 864 can read the datasets in the log lines of the files from each respective topic, map the datasets from the log lines into fields of a common (normalized) format, transform the datasets, and load the datasets for storage in the data store database 840. The data ingestion module 864 also receives delivery events streamed by trackers 904, from the streaming platform 860, performs various enrichments to these events, and streams the events into HDFS/Hive. The data store database 840 can be embodied as Hadoop Distributed File System (HDFS)/Hive data warehouse.

A reporting/analytics engine 866 can include a reporting platform and an analytics platform. The reporting/analytics engine 866 can calculate values associated with the campaign, as described above. The reporting platform reads and/or retrieves the datasets from the data store database 840 and loads it into an analytics platform. The analytics platform can execute necessary aggregations to generate a report including the calculated values. The reporting platform can be embodied as Vega and the analytics platform can be HPE Vertica. The analytics platform can provide the discrepancy report to a reporting application 855 to provide the discrepancy report to a user device (e.g., user device 870 as shown in FIG. 8). The reporting application 855 can be embodied as Visto™ Reporting.

The ETL process can include a deserialization operation, a filtering operation, a tokenization operation, a normalization operation, and a store operation. In the deserialization operation the datasets in the cost log, measurement log, and ad server files is broken down to extract the raw data from the files and create new objects. In the filtering operation, the datasets and/or event level data that do not have a valid transaction ID can be removed. The transaction ID can be a unique ID generated at the execution of an impression that is disseminated to the third party systems through a tag. As described above, tags can be code such as HTML, used to track/identify datasets in third party systems, such as event and/or impression level data. In the filtering operation, datasets associated with any impression that is flagged as having been served to an IP address marked by the IAB Bots and Spiders List as non-human traffic, can be removed.

In the tokenization operation, the datasets from different third party systems can be aggregated, joined, and/or merged based on the transaction ID associated with each of the datasets. During the tokenization operation each of the datasets can be aggregated from the one or more files, into one or more groups based on the unique transaction ID associated with each of the datasets. The datasets associated with impression event records from different third party systems can be matched (i.e., grouped). The data points passed from each third party system can be broken down into distinct objects so the datasets can be reassembled into a coherent dataset. In the normalization operation, the datasets from the different third party systems can be reassembled into a Visto™ data format (columns) that allows for creation of a readable dataset combining data from all third party systems. In the store operation, the reassembled datasets are prepared and stored in the data store database (i.e., Hive data warehouse).

The data ingestion module can execute an enrichment process on the event level data streamed through the trackers. The enrichment process can include a deserialization operation, a filtering operation, a device enrichment operation, a geographic (geo) enrichment operation, a semantic enrichment operation, and a store operation. The deserialization operation, and filtering operation, can be executed as described above with respect to the ETL process. In the device enrichment process, the device and (internet) browser data associated with the event level data can be determined based on a user agent from the (internet) browser associated with the event level data, using a file provided by a DeviceAtlas source. The DeviceAtlas source can be used to analyze web traffic device detection. The DeviceAtlas source is a platform configured to provide data on all mobile and connected devices including smartphones, tablets, laptops, and wearable devices. It can be appreciated sources other than the DeviceAtlas source can be used to provide the same data.

In the geographic enrichment operation, IP addresses of the user viewing the impression event associated with the event level data can be extracted. A file provided by a source such as Neustar can be used to look up the geographic location of the IP address. Neustar is a platform that can provide real-time information and analytics. It can be appreciated sources other than the Neustar can be used to provide the same data.

In the semantic enrichment operation, a Uniform Resource Locator (URL) from a website of the impression event associated with the event level data is captured and transmitted to a context marketing engine such as Grapeshot. The context marketing engine can return a specified number (i.e., top five) classification (in IAB categories) for the website. Grapeshot is a platform to segment inventory and improve target marketing. It can be appreciated sources other than the Grapeshot can be used to provide the same data.

In the store operation, the resultant data from the deserialization operation, filtering operation, device enrichment operation, geographic (geo) enrichment operation, and semantic enrichment operation can be stored in the data store database. Additionally, the resultant data from the device enrichment operation, geographic (geo) enrichment operation, and semantic enrichment operation can be stored as user attribute data in the visitor attribute database.

In one embodiment, the system ingests datasets from files, from different impression-level and aggregated streams. Such datasets can come directly from each vendor involved in serving or measuring an impression. Once the data is ingested, an ETL process is executed to join data together based on a transaction ID passed to each vendor via creative tags.

In these respects, after an ad campaign is run, the system can analyze performance of the ad by creating a synthetic "holdout" group that was in the bid stream and who weren't reached and compare subsequent behaviors against those who were reached.

In some embodiments, the system selects a pattern of behavior to look for correlations between the synthetic group. That is, the system determines behaviors that would perform the positive event regardless of whether shown the advertisement and also behaviors that would not perform the positive event regardless of whether shown the advertisement.

The system may first choose random behavioral metrics and determine the positive and negative incidence across the targeted group and the synthetic group.

The system may then use statistical regression models to determine dependent variable and one or more independent variables.

The system can pick several different types of models to test the correlation of the behavioral data to positive and negative conversion events. Conversion or converting events may refer to click-through rate, time spent browsing an advertiser's website, a purchase on an advertiser's website, or any other metric that the advertiser deems as a converting event. It should be appreciated that the system may first select a linear model and then test other regression models that will determine the explanatory value of an independent variable.

In this way, the system starts with a random behavior pattern and tracks both positive and negative correlation. The regression then tests the difference in behavior in the target group against the behavior in the synthetic group. And determines if there is statistically significant positive or negative correlation. The system then looks to all behavioral patterns to find all statically significant positive or negative correlations.

It should be appreciated that the system can use linear modeling, machine learning decision tree model, or any other statistical modeling methodology. In some of these embodiments, the system may begin with a random behavioral pattern to test linear regression and then uses decision trees to determine adaptive behavioral patterns to test in a subsequent linear regression analysis. In this way, the system will use machine learning to determine the behaviors that have the greatest positive and negative correlations.

In many embodiments, the system will determine past behaviors that would indicate a consumer would never make a converting event and behaviors that would indicate a consumer would make a converting event regardless of ad presentation. The system may determine missed opportunities and wasted bandwidth in order to modify advertising spend targets (both in fiscal and bandwidth capacities). The system will identify consumers in the synthetic group—who could have been targeted with the advertisement—who would did not perform the converting event, but who would have been likely to perform the converting event had that consumer been shown the ad. The system can identify these consumers and attempt to target them in future contracts. The system may also determine wasted bandwidth and financial spend by determining users in the target group who would likely never perform the converting event and thus were not proper targets of the ad. The system may also determine wasted bandwidth and financial spend by determining users in the target group who performed the converting event who would likely have done so absent the advertisement. This would also allow the system to give a proper advertising effectiveness metrics by highlighting an advertisement's incremental lift.

The system may then further select audiences in real time based on each potential consumers stored behavioral history. The system will look at the models created from the conversion event target group behavior modeled against the conversion event synthetic group behavior. The system then runs statistical models against the behavioral patterns of the potential consumer in the bid stream based on the potential consumer's stored transactional history in a data cloud for positive and negative metrics in order to determine in real time whether to bid on an available ad inventory to present to the potential consumer.

It should be appreciated that this system may be used to determine what advertisements are most and least effective to show to particular consumers based on their browsing history. In these embodiments, the system may, upon being presented with an available ad placement for a particular consumer id, match the consumer id with transactional data associated with that consumer id stored on a data server, match that behavioral data against models for effectiveness of advertisement, and choose what type (if any) to display to that consumer consistent with those models.

The invention claimed is:

1. A method of determining effectiveness of a campaign comprising:
  receiving a bidstream, the bidstream including bids on available advertising inventory and a plurality of consumer characteristics associated with the bids;
  identifying, during a web session, personally identifiable information (PII) that matches a consumer characteristic from the plurality of consumer characteristics in the bidstream;
  linking a cookie associated with the web session to a universal identifier for a consumer that corresponds to the consumer characteristic in the bidstream;
  recording, during the web session, impression data for a plurality of webpages having at least one executable tag, each of the plurality of webpages requested by a browser application associated with the cookie;
  accessing, via a data cloud, user profiles of a plurality of consumers, the accessing including using the cookie to limit a respective user profile for each one of the plurality of consumers to a particular device;
  determining a target group in the bidstream, by matching, via the data cloud, a plurality of consumers to at least one successful bid in a campaign, each consumer in the plurality of consumers in the target group each having an impression for a piece of content displayed associated with the at least one successful bid;
  retroactively creating a synthetic group in the bidstream by matching, via the data cloud, a plurality of consumers to at least one unsuccessful bid in the campaign, each consumer in the synthetic group being not identified to be included in a holdout group at a time of running the campaign and not being exposed with a piece of content associated with the at least one unsuccessful bid;
  determining, by a machine learning module implemented on a hardware processor, the plurality of consumer characteristics in the target group and the retroactively created synthetic group by:
    training a neural network machine learning model on past impression data, past consumer actions, and past consumer characteristics;
    determining, using the trained neural network machine learning model, statistically significant positive and negative correlations between actions performed by consumers in the target and the retroactively created synthetic groups to multiple random behavioral patterns;
    for each consumer in the target and retroactively created synthetic groups, evaluating the statistically significant positive and negative correlations to each random behavioral pattern using a machine learning decision tree model that determines behavioral patterns that are positive and negative for a desired event, the evaluating of the positive and negative correlations to each random behavioral pattern including determining a first behavioral pattern indicating consumers who would not perform the desired event regardless of ad exposure, a second behavioral pattern indicating consumers who would perform the desired event regardless of ad exposure, and a third behavioral pattern indicating consumers whose behavior would be influenced by ad exposure, the third behavioral pattern representing an advertising influence on the consumers for performing the desired event; and in response to determining the third behavioral pattern using the machine learning decision tree model, testing, using a regression model, the third behavioral pattern to determine an explanatory value of an independent variable that is representative of the third behavior pattern for predicting advertising influence;

determining that a consumer characteristic corresponding to the universal identifier for the consumer in the bidstream is likely to lead to the desired event based on the explanatory value of the independent variable representative of the third behavior pattern;

measuring an incremental impact of the at least one successful bid on the plurality of consumers in the retroactively created synthetic group based on the determining of the consumer characteristic; and dynamically adjusting transmission of content from available inventory based on the measured incremental impact.

2. The method of claim 1, wherein the data cloud further stores consumer browsing and online transaction behaviors.

3. The method of claim 1, wherein the data cloud further stores consumer behavior in a plurality of physical stores.

4. The method of claim 1, wherein the data cloud further stores geographic information.

5. The method of claim 4, wherein the geographic information is based on a consumer's geolocation.

6. The method of claim 1, wherein the desired event is an online transaction.

7. The method of claim 1, wherein the desired event is a physical transaction.

8. The method of claim 1, wherein the desired event is providing additional consumer information.

9. The method of claim 1, wherein the consumer characteristics are consumer demographics.

10. The method of claim 2, wherein the consumer characteristics are based on the consumer browsing behavior.

11. A non-transitory computer-readable medium having stored thereon instructions to cause a computer to execute a method, the method comprising:

receiving a bidstream, the bidstream including bids on available advertising inventory and a plurality of consumer characteristics associated with the bids;

identifying, during a web session, personally identifiable information (PII) that matches a consumer characteristic from the plurality of consumer characteristics in the bidstream;

linking a cookie associated with the web session to a universal identifier for a consumer that corresponds to the consumer characteristic in the bidstream;

recording, during the web session, impression data for a plurality of webpages having at least one executable tag, each of the plurality of webpages requested by a browser application associated with the cookie;

accessing, via a data cloud, user profiles of a plurality of consumers, the accessing including using the cookie to limit a respective user profile for each one of the plurality of consumers to a particular device;

determining a target group in the bidstream, by matching, via the data cloud, a plurality of consumers to at least one successful bid in a campaign, each consumer in the plurality of consumers in the target group having an impression for a piece of content displayed associated with the at least one successful bid;

retroactively creating a synthetic group in the bidstream by matching, via the data cloud, a plurality of consumers to at least one unsuccessful bid in the campaign, each consumer in the synthetic group being not identified to be included in a holdout group at a time of running the campaign and not being exposed with a piece of content associated with the at least one unsuccessful bid;

determining, by a machine learning module implemented on a hardware processor, the plurality of consumer characteristics in the target group and the retroactively created synthetic group by:

training a neural network machine learning model on past impression data, past consumer actions, and past consumer characteristics;

determining, using the trained neural network machine learning model, statistically significant positive and negative correlations between actions performed by consumers in the target and the retroactively created synthetic groups to multiple random behavioral patterns;

for each consumer in the target and retroactively created synthetic groups, evaluating the statistically significant positive and negative correlations to each random behavioral pattern using a machine learning decision tree model that determines behavioral patterns that are positive and negative for a desired event, the evaluating of the positive and negative correlations to each random behavioral pattern including determining a first behavioral pattern indicating consumers who would not perform the desired event regardless of ad exposure, a second behavioral pattern indicating consumers who would perform the desired event regardless of ad exposure, and a third behavioral pattern indicating consumers whose behavior would be influenced by ad exposure, the third behavioral pattern representing an advertising influence on the consumers for performing the desired event; and in response to determining the third behavioral pattern using the machine learning decision tree model, testing, using a regression model, the third behavioral pattern to determine an explanatory value of an independent variable that is representative of the third behavior pattern for predicting advertising influence;

determining that a consumer characteristic corresponding to the universal identifier for the consumer in the bidstream is likely to lead to the desired event based on the explanatory value of the independent variable representative of the third behavior pattern;

measuring an incremental impact of the at least one successful bid on the plurality of consumers in the retroactively created synthetic group based on the determining of the consumer characteristic; and dynamically adjusting transmission of content from available inventory based on the measured incremental impact.

12. A system, comprising:

a processor, and a computer-readable medium having stored thereon instructions to cause the processor to execute a method, the method comprising:

receiving a bidstream, the bidstream including bids on available advertising inventory and a plurality of consumer characteristics associated with the bids;

identifying, during a web session, personally identifiable information (PII) that matches a consumer characteristic from the plurality of consumer characteristics in the bidstream;

linking a cookie associated with the web session to a universal identifier for a consumer that corresponds to the consumer characteristic in the bidstream;

recording, during the web session, impression data for a plurality of webpages having at least one executable tag, each of the plurality of webpages requested by a browser application associated with the cookie;

accessing, via a data cloud, user profiles of a plurality of consumers, the accessing including using the cookie to limit a respective user profile for each one of the plurality of consumers to a particular device;

determining a target group in the bidstream, by matching, via the data cloud, a plurality of consumers to at least one successful bid in a campaign, each consumer in the plurality of consumers in the target group having an impression for a piece of content displayed associated with the at least one successful bid;

retroactively creating a synthetic group in the bidstream by matching, via the data cloud, a plurality of consumers to at least one unsuccessful bid in the campaign, each consumer in the synthetic group being not identified to be included in a holdout group at a time of running the campaign and not being exposed with a piece of content associated with the at least one unsuccessful bid;

determining, by a machine learning module implemented on a hardware processor, the plurality of consumer characteristics in the target group and the retroactively created synthetic group by:

training a neural network machine learning model on past impression data, past consumer actions, and past consumer characteristics;

determining, using the trained neural network machine learning model, statistically significant positive and negative correlations between actions performed by consumers in the target and the retroactively created synthetic groups to multiple random behavioral patterns;

for each consumer in the target and retroactively created synthetic groups, evaluating the statistically significant positive and negative correlations to each random behavioral pattern using a machine learning decision tree model that determines behavioral patterns that are positive and negative for a desired event, the evaluating of the positive and negative correlations to each random behavioral pattern including determining a first behavioral pattern indicating consumers who would not perform the desired event regardless of ad exposure, a second behavioral pattern indicating consumers who would perform the desired event regardless of ad exposure, and a third behavioral pattern indicating consumers whose behavior would be influenced by ad exposure, the third behavioral pattern representing an advertising influence on the consumers for performing the desired event; and in response to determining the third behavioral pattern using the machine learning decision tree model, testing, using a regression model, the third behavioral pattern to determine an explanatory value of an independent variable that is representative of the third behavior pattern for predicting advertising influence;

determining that a consumer characteristic corresponding to the universal identifier for the consumer in the bidstream is likely to lead to the desired event based on the explanatory value of the independent variable representative of the third behavior pattern;

measuring an incremental impact of the at least one successful bid on the plurality of consumers in the retroactively created synthetic group based on the determining of the consumer characteristic; and dynamically adjusting transmission of content from available inventory based on the measured incremental impact.

13. The system of claim 12, wherein the data cloud further stores consumer browsing and online transaction behaviors.

14. The system of claim 12, wherein the data cloud further stores geographic information.

15. The system of claim 14, wherein the geographic information is based on a consumer's geolocation.

16. The system of claim 12, wherein the desired event is an online transaction.

17. The system of claim 12, wherein the desired event is a physical transaction.

18. The system of claim 12, wherein the desired event is providing additional consumer information.

* * * * *